UNITED STATES PATENT OFFICE.

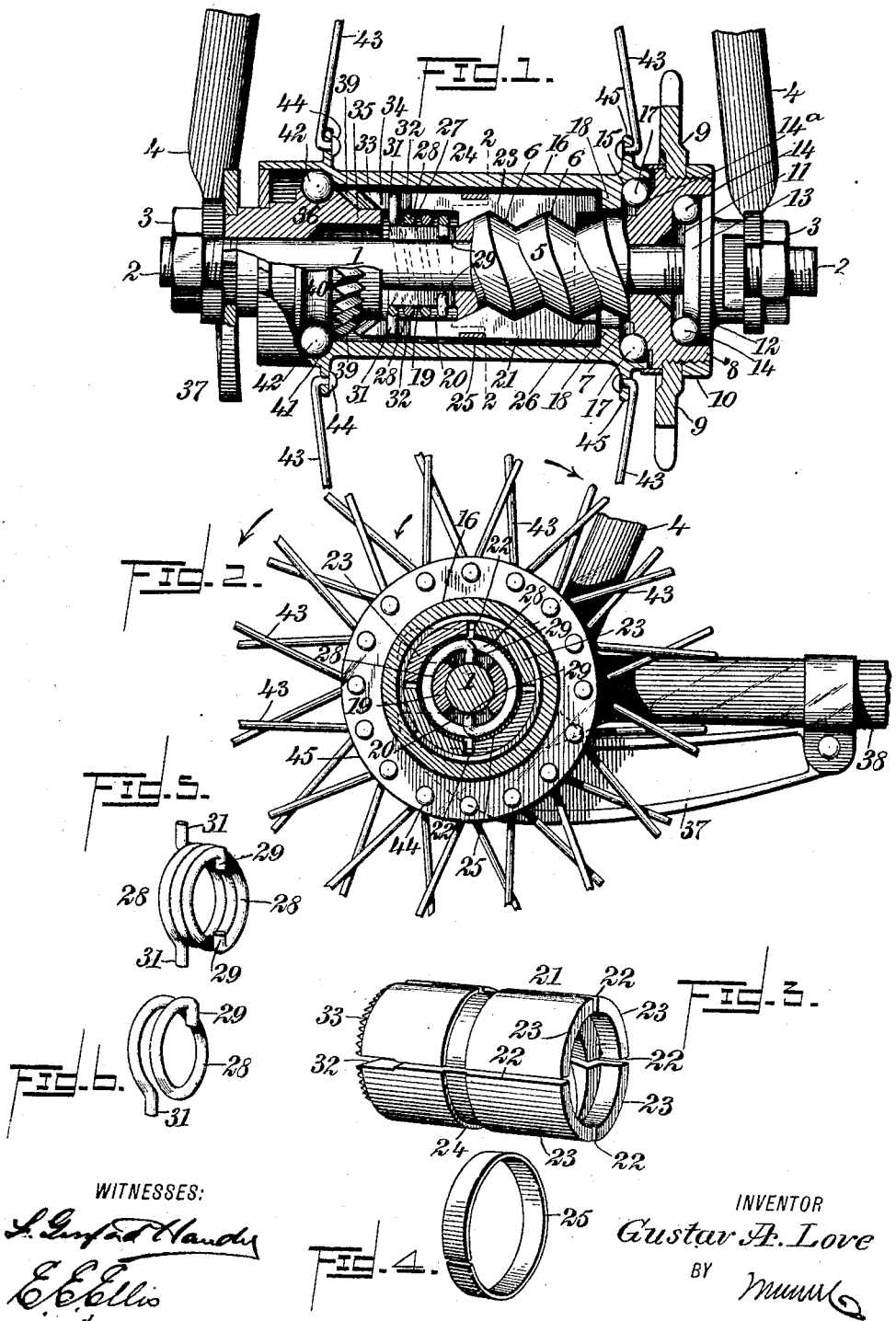

GUSTAV A. LOVE, OF COKATO, MINNESOTA.

BRAKE FOR BICYCLES.

No. 813,906.  Specification of Letters Patent.  Patented Feb. 27, 1906.

Application filed March 22, 1904. Serial No. 199,343.

*To all whom it may concern:*

Be it known that I, GUSTAV A. LOVE, a citizen of the United States, and a resident of Cokato, in the county of Wright and State of Minnesota, have invented a new and Improved Brake for Bicycles, of which the following is a full, clear, and exact description.

This invention relates to vehicle-brakes; and it consists, substantially, in the construction and combinations of parts hereinafter particularly described, and pointed out in the claims.

The invention has reference more especially to back-pedaling brakes for bicycles and similar vehicles; and one of the principal objects thereof is to overcome numerous disadvantages and objections common to many other structures hitherto devised for similar purposes.

A further object is to provide a brake of this kind which is simple and comparatively inexpensive to manufacture, besides being thoroughly effective and reliable in operation and possessing the capacity for long and repeated service.

The above and additional objects are attained by means substantially such as are illustrated in the accompanying drawings, forming a part of this specification, in which similar characters of reference indicate corresponding parts in all the figures.

Figure 1 is a longitudinal sectional view showing the application of my improved bicycle-brake. Fig. 2 is a vertical transverse sectional view taken on the line 2 2 of Fig. 1. Fig. 3 is a view in perspective of the inner expansible friction device. Fig. 4 is a similar view of the contracting ring for the expansible friction device. Fig. 5 is a view in perspective of the duplicate springs employed in connection with the expansible friction device and the operating device for the latter, and Fig. 6 is a similar view in detail of one of the springs shown in the preceding view.

Before proceeding with a more detailed description it may be stated that in the form of my improvements herein shown I provide the axle of the rear wheel of a bicycle or similar vehicle with a specially-constructed rotatable member for operating a specially-constructed expansible device to frictionally engage the inner surface of the hub of the wheel by which to accomplish the forward movement of the latter in the ordinary operation of the machine, said friction device being provided with means for automatically disengaging the same from the hub on temporarily checking the driving power of the wheel for the purpose of coasting with the machine in the ordinary manner. In connection with the friction device I also employ a stationary member as an aid thereto in effecting certain operations of the brake, combined with which device and said member are springs of special construction and organization for accomplishing the quick release or separation of the several elements to permit the machine to be driven forwardly.

I have herein represented my improvements in a certain selected embodiment; but it will be understood, of course, that I am not limited to the precise details thereof in practice, since immaterial changes therein may be resorted to coming within the scope of my invention.

Specific reference being had to the drawings by the designating characters marked thereon, 1 represents the axle of the rear wheel of an ordinary bicycle, to the screw-threaded end portions 2 of which are rigidly secured, by means of nuts 3, the lower end portions 4 of the supporting-frame for the wheel. Mounted upon said axle from one end is a rotatable member 5, having on the exterior thereof preferably Λ-shaped spiral threads 6 of the desired pitch, said member terminating outwardly in a cone 7, having a straight externally-threaded portion 8, to which is fitted the ordinary driving-sprocket 9 for the wheel, (only shown in part,) said sprocket being held in place thereon by means of a nut 10, as shown in Fig. 1. The outer face of said portion 8 is provided with a recess at 11, and working in said recess is an adjusting device 12 on the axle, having an annular groove 13, forming, with the sides and base of the recess, a raceway for a set of antifriction-balls 14, upon which the said cone turns. The inner face of the cone 7 is also formed with an annular seat 14ª, coöperating with a similar seat 15 at the adjacent end of the hub 16 of the wheel in the formation of a raceway for another set of antifriction-balls 17 for said hub. At this end thereof the hub is provided with an inwardly-projecting flange or shoulder 18, and it will be noted that the said rotatable member 5 is reduced in external diameter for a suitable distance from the inner end thereof, forming a straight portion 19, which is constructed at diametrically opposite sides with notches or slots 20, extending practically the full length of the same, the width of said notches or slots being such as to permit of the forward turning of the rotatable member without affecting or altering the relation of other parts, as will more fully appear hereinafter.

Working upon the rotatable member 5 is a friction device 21, constructed interiorly to conform to the external construction of the member, said device being practically a cylinder split or divided longitudinally for its whole length at 22 into preferably four (more or less) equal sections 23, a continuous annular groove 24 being formed in the outer surface of the device, as shown, in which is seated flushly with the outer surfaces of said sections a split ring 25, tending to contract the sections about said rotatable member 5. At the end thereof adjacent to the cone 7 the friction device is preferably enlarged or recessed interiorly at 26 a suitable distance, while at its other end said device is similarly enlarged or recessed at 27, so as to accommodate the seating upon the inner straight portion 19 of the member 5 of duplicate reversely-organized springs 28, each having its inner extremity 29 turned inwardly and entering one of the notches or slots 20 of said straight portion and its outer extremity 31 turned outwardly and entering between the sides of opposite recesses 32, formed at opposite sides of the other end of the friction device in adjacent edges of adjoining sections thereof, it being noted that the extremities of each spring are diametrically opposite to each other. At this end also the friction device 21 is constructed all around internally with a series of inwardly-beveled teeth 33, the inner edges or corners 34 of which normally abut or engage with the outer surface of the inner extremity of an adjacent straight portion 35 of a cone 36, rigidly held in position upon the axle 1 by means of an arm 37 (see Fig. 2) connecting said cone with a portion 38 of the frame of the machine. The inner face of this stationary cone 36 is formed some distance beyond the said inner extremity of the straight portion 35 thereof with an annular series of upwardly and outwardly beveled teeth 39, and the cone is also provided beyond these teeth with an annular groove 40, coöperating with another groove 41 in the corresponding end of the hub in the formation of a raceway for a set of antifriction-balls 42, as shown. The spokes of the wheel are indicated at 43, the same being fastened in the ordinary way at 44 to flanges 45 of said hub, and attention is called to the fact that the external diameter of the friction device (when the sections thereof are contracted) is somewhat less than the internal diameter of the said hub 16.

The normal positions of the parts are indicated in Fig. 1, and on pedaling the machine (not shown) forwardly in the usual way the sprocket-wheel 9 will also be operated forwardly, (to the right in Fig. 2,) as will the rotatable member 5, this being apparent from the construction above explained. In consequence of this movement of said member 5 the friction device 21 is caused to move longitudinally of the member (to the right in Fig. 2) to a limited extent, since it cannot turn therewith by reason of the fact that its inner end portion is practically clamped upon the end of the adjacent straight portion 35 of the cone 36, and when the outer or right-hand (Fig. 1) extremity of said device encounters the inwardly-projecting flange or shoulder 18 of the hub the continued application of power to the sprocket-wheel causes a pressure of such extremity against said flange with the result that the sections of the device expand until their outer surfaces frictionally engage with the inner surface of the hub, thus producing forward motion of the wheel of which said hub constitutes a part. The expansion of the sections of the friction device is exerted against the compressive force of the ring 25 therefor and on temporarily checking the driving power of the sprocket-wheel for the purpose of coasting with the machine the said ring immediately acts to again contract said sections, thereby disengaging them from the hub and enabling the latter to continue to rotate forwardly upon the ball-bearings 17 and 42 therefor, it being understood that the rotatable member 5 turns on the similar bearings 14. Now by back pedaling with the machine the motion of the sprocket-wheel and rotatable member 5 is reversed, of course, with the result that the friction device is moved longitudinally of said member in the opposite direction, the inner end portion thereof moving slightly along the adjacent straight portion 35 of the cone 36 until its teeth 33 effect abutting engagement with the teeth 39 of said cone, whereupon the pressure thus exerted causes the sections of the friction device to again expand and engage with the hub as before. As soon as the engagement between the two sets of teeth referred to begins to take place those sides of the notches in the inner reduced end portion 19 of the friction device lying in the direction (rearward) of movement now followed by said device engage the inwardly-turned inner extremities of the springs 28, and in view of the fact that the outer extremities 31 of the springs are held between the sides of the opposite recesses 32 in the corresponding end of the friction device said springs are caused to expand or partially uncoil, thereby placing them under tension, and therefore when the back-pedaling pressure is removed from the rotatable member the said springs instantly coil up again, serving by their action to release and again place the parts in their normal relations. It is thought the construction and operation of my improvements will be fully understood without further elucidation, although it may be added that the distance between the sides of the said notches in the reduced inner end portion of the rotatable member 5 is such as to permit of the forward turning of said member without said sides engaging or affecting the springs referred to.

Having thus described my invention, I claim as new and desire to secure by Letters Patent—

1. In a brake for bicycles, the combination with the driving-sprocket and hub of the rear wheel of the machine, of a rotatable member rigid with said sprocket and extending into the hub, the latter having an inner shoulder at one end, an expansible friction device mounted on the member, means for moving said device longitudinally of the member to engage said shoulder to expand the device on forwardly rotating the member with the sprocket, a stationary member with which the other end of the friction device has interlocking engagement, and springs for returning the parts to their normal position.

2. In a brake for bicycles, the combination with the driving-sprocket hub of the rear wheel of the machine, of a rotatable member rigid with said sprocket and extending into the hub, the latter having an inner shoulder at one end, an expansible friction device mounted on the member provided with teeth at one end, and means for moving said device longitudinally of the member to engage said shoulder to expand the device on forwardly rotating the member with the sprocket, said expansible device comprising longitudinally-separated sections, and a split clamping-ring therefor, a fixed member provided with teeth with which the teeth of the friction device are adapted to engage, and reversely-disposed springs engaging the rotatable member and the friction device.

3. In a brake for bicycles, the combination with the driving-sprocket and hub of the rear wheel of the machine, of a cone rigid with said sprocket and having an externally-threaded member rotating therewith and extending therefrom into said hub, an expansible friction device mounted upon and internally threaded in conformity with said member, and an inner abutment at one end of the hub, said friction device comprising longitudinally-separated sections, and a split clamping-ring therefor.

4. In a brake for bicycles, the combination with the driving-sprocket and hub of the rear wheel of the machine, of a rotatable member rigid with said sprocket and extending into the hub, an expansible friction device mounted on said member, and provided at its inner end with teeth, a stationary member having similar teeth, and means for expanding said device to engage with the hub on reversely rotating said first-named member with the sprocket, and also for forcing the teeth of the device into engagement with the teeth of said stationary member.

5. In a brake for bicycles, the combination with the driving-sprocket and hub of the rear wheel of the machine, of a rotatable member rigid with said sprocket and extending into the hub, an expansible friction device mounted on said member, and provided at its inner end with teeth, a stationary member having similar teeth, and means for expanding said device to engage with the hub on reversely rotating said first-named member with the sprocket, and also for forcing the teeth of the device into engagement with the teeth of said stationary member, said friction device comprising longitudinally-separated sections, and a split clamping-ring.

6. In a brake for bicycles, the combination with the driving-sprocket and hub of the rear wheel of the machine, said hub having an internal shoulder of a threaded rotatable member rigid with the sprocket and entering the hub from one end, said rotatable member having a reduced inner end formed with opposite slots, an expansible longitudinally-movable friction device mounted on said member, the latter being mounted on the axle in the hub, duplicate springs reversely disposed upon said end portion, with one of their extremities entering the slots, and the other turned outwardly and engaged by the friction device, and a stationary member forming an abutment for the friction device and engaging therewith to expand the same by reverse movement imparted to the rotatable member from the sprocket.

7. In a brake for bicycles, the combination with the driving-sprocket and hub of the rear wheel of the machine, said hub having an interior shoulder of a threaded rotatable member rigid with the sprocket and entering the hub from one end, said rotatable member having a reduced inner end formed with opposite slots, an expansible longitudinally-movable friction device mounted on said member, the latter being mounted on the axle in the hub, duplicate springs reversely disposed upon said end portion, with one of their extremities entering the slots, and the other turned outwardly and engaged by the friction device, and a stationary member forming an abutment for the friction device, and engaging therewith to expand the same by reverse movement imparted to the rotatable member from the sprocket, said friction device being internally threaded in conformity with said rotatable member, and comprising longitudinally-separated sections, and a split clamping-ring therefor.

8. In a brake for bicycles, the combination with the driving-sprocket, and the hub of the rear wheel, having a shoulder, of a rotatable member rigid with the sprocket-wheel and extending into the hub, a longitudinally-movable expansible friction device mounted on said member, springs reversely disposed upon the inner end of the rotatable member and engaging the rotatable member and the friction device, and a stationary member forming an abutment for the friction device and with which it has interlocking engagement.

9. In a brake for bicycles, the combination with the driving-sprocket, and the hub of the rear wheel having an internal shoulder at one end, of a rotatable member rigid with the sprocket-wheel and extending into the hub, said member having a reduced inner end, an expansible friction device mounted on said member and engaged thereby, springs reversely disposed upon the reduced end of the movable member and engaging the reduced end of the said member and the expansion device, and a stationary member forming an abutment for the friction device and with which it has interlocking engagement.

In testimony whereof I have signed my name to this specification in the presence of two subscribing witnesses.

GUSTAV A. LOVE.

Witnesses:
J. C. JOHNSON,
C. J. CARLSON.